US012793688B2

(12) United States Patent
Chen et al.

(10) Patent No.: US 12,793,688 B2
(45) Date of Patent: Nov. 10, 2026

(54) SPEECH MASKING METHOD AND SYSTEM, ELECTRONIC DEVICE, AND NON-TRANSITORY COMPUTER READABLE STORAGE MEDIUM

(71) Applicant: AAC Acoustic Technologies (Shanghai) Co., Ltd., Shanghai (CN)

(72) Inventors: Lianwu Chen, Shanghai (CN); Huan Ge, Shanghai (CN); Xuejing Sun, L.A., CA (US)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 192 days.

(21) Appl. No.: 18/733,601

(22) Filed: Jun. 4, 2024

(65) Prior Publication Data

US 2025/0336384 A1 Oct. 30, 2025

Related U.S. Application Data

(63) Continuation of application No. PCT/CN2024/090326, filed on Apr. 28, 2024.

(51) Int. Cl.
*G10K 11/175* (2006.01)

(52) U.S. Cl.
CPC .. *G10K 11/1754* (2020.05); *G10K 2210/3038* (2013.01)

(58) Field of Classification Search
CPC ...... G10K 11/1754; G06N 3/045; G06N 3/08; H04L 63/00; H04L 63/044; H04W 72/04; G10L 15/00
See application file for complete search history.

(56) References Cited

U.S. PATENT DOCUMENTS

| | | | | |
|---|---|---|---|---|
| 7,184,952 | B2 * | 2/2007 | Hillis | G10K 15/02 704/E21.001 |
| 12,272,369 | B1 * | 4/2025 | Chhetri | G10L 21/0216 |
| 2021/0360349 | A1 * | 11/2021 | Nyayate | G06N 3/044 |
| 2025/0048043 | A1 * | 2/2025 | Lovchinsky | H04S 7/303 |
| 2025/0124171 | A1 * | 4/2025 | Maziewski | G06F 21/6254 |
| 2025/0227421 | A1 * | 7/2025 | Morris | H04S 7/302 |
| 2025/0308514 | A1 * | 10/2025 | Sattler | G10L 21/0208 |

* cited by examiner

*Primary Examiner* — Rasha S Al Aubaidi
(74) *Attorney, Agent, or Firm* — Wiersch Law Group

(57) ABSTRACT

The disclosure relates to the field of communication security and discloses a speech masking method and system, an electronic device, and a non-transitory computer readable storage medium. In the disclosure, after the target speech is obtained, the target speech is not masked according to the traditional fixed masking method, but the target masking effect is determined in advance, and the target masking effect can be determined according to different requirements. After that, the neural network model is trained according to different target masking effects, and the neural network model trained according to the different target masking effects can dynamically provide different masking signals for the target speech. In this way, different masking signals can be generated for different target speeches according to different needs, more scenarios can be applied, and good masking effects can be obtained, thereby improving user experience.

13 Claims, 4 Drawing Sheets

SPEECH MASKING METHOD AND SYSTEM, ELECTRONIC DEVICE, AND NON-TRANSITORY COMPUTER READABLE STORAGE MEDIUM

CROSS REFERENCE TO RELATED APPLICATIONS

The present application is a continuation of PCT Patent Application No. PCT/CN2024/090326, filed Apr. 28, 2024, which is incorporated by reference herein in its entirety.

TECHNICAL FIELD

The various embodiments described in this document relate in general to the field of communication security, and more specifically to a speech masking method and system, an electronic device, and a non-transitory computer readable storage medium.

BACKGROUND

Speech masking technology is a technique to make communication content unintelligible to unauthorized personnel by playing specific masking signals, for example by confusing or adding noise to voice of calls or voice of offline conversations. This technology can be applied to, for example, call scenarios or offline conversation scenarios in real time, to ensure that the communication content is merely understood by the participants and is unintelligible to others.

For example, in practical scenarios, specialized microphones and loudspeaker devices may be arranged in the talking place, or devices already available in the place may be utilized. For example, in the in-vehicle scenarios, the microphone in the car can be used to collect the voice of the back seat passengers, a masking signal is generated after analysis and processing, and the masking signal is played through the driver's headrest speaker, so that the driver is unable to hear the conversation content in the back seat passengers, to achieve privacy protection. In related technologies, for different speakers and different speech contents of the same speaker, a fixed masking signal generation method is used to achieve speech masking. Therefore, the use of this method is unable to generate different masking signals for different speeches according to different needs, and has relatively simple applicable scenarios and has general masking effect, thereby affecting the user experience.

SUMMARY

Embodiments of the disclosure aim to provide a speech masking method and system, an electronic device, and a non-transitory computer readable storage medium, so that different masking signals can be generated according to needs for different speech contents to obtain good masking effects.

In view of the above, embodiments of the disclosure provide a speech masking method, including: obtaining a target speech upon detecting that at least one target person is talking; determining a training manner for a neural network model according to a target masking effect and training the neural network model; generating a masking signal according to the neural network model trained and the target speech; and playing the masking signal.

Embodiments of the disclosure further provide a speech masking system, including: a radio module including a microphone configured to receive a target speech and to transmit the target speech to a masking signal generation module; the masking signal generation module being configured to generate a masking signal using a neural network model after receiving the target speech, and to send the masking signal to a playing module, where a training manner for the neural network model is determined according to a target masking effect; and the playing module including a loudspeaker configured to play the masking signal, such that the masking signal is transmitted to a receiving party.

Embodiments of the disclosure further provide an electronic device, including: at least one processor; and a memory communicatively connected with the at least one processor. The memory is configured to store instructions executable by the at least one processor, and the instructions, when executed by the at least one processor, cause the at least one processor to execute the speech masking method described above.

Embodiments of the disclosure further provide a non-transitory computer readable storage medium storing computer programs. The computer programs, when executed by at least one processor, cause the at least one processor to perform the above speech masking method described above.

In embodiments of the disclosure, a target speech is obtained when a target person is detected to speak. A training method for training a neural network model is determined according to a target masking effect to train the neural network model. A masking signal is generated according to the neural network model and the target speech. Thereafter, the masking signal is played. In the embodiment of the present disclosure, after the target speech is obtained, the target speech is not masked according to the traditional fixed masking method, but the target masking effect is determined in advance, and the target masking effect can be determined according to different needs. After that, the neural network model is trained according to different target masking effects, and the neural network model trained according to the different target masking effects can dynamically provide different masking signals for target speeches. In this way, different masking signals can be generated for different target speeches according to different needs, more scenarios are suitable, good masking effects can be obtained, and user experience can be improved.

In some embodiments, obtaining the target speech upon detecting that the at least one target person is talking includes: detecting by a microphone that the at least one target person is making voice in a call environment; and marking, in response to voice information included in the voice being voice information that requires privacy protection, the voice as the target speech and obtaining the target speech. This method can be used in a variety of scenarios where privacy of calls needs to be protected, including business negotiations, legal counselling, medical consultations, etc.

In some embodiments, the target masking effect includes a speech masking effect and a comfort degree of a receiving party for receiving the masking signal, where the speech masking effect includes at least one of speech intelligibility of a mixed sound signal and speech recognition accuracy of the mixed sound signal, and the comfort degree includes at least one of energy of the masking signal and energy of the mixed sound signal. The lower the speech intelligibility of the mixed sound signal, the better the speech masking effect. The lower the speech recognition accuracy of the mixed sound signal is, the better the speech masking effect is. The lower the energy of the masking signal, the higher the comfort degree. The lower the energy of the mixed sound signal, the higher the comfort degree. The mixed sound signal is obtained by mixing the signal of the target speech and the masking signal. During determining of the target masking effect, it is necessary to comprehensively consider multiple factors, to ensure that the masking effect can be achieved while considering the impact of the masking signal played on other personnel. Therefore, during determining of the target masking effect, the experience of the target user and the masking signal receiver can be enhanced when comprehensively considering the above factors.

In some embodiments, a target masking area is determined before playing the masking signal. The lower the volume of the masking signal in an area outside the target masking area, the smaller the impact of the masking signal on the surrounding environment. In different scenarios, the masking signal may be played for different receiving targets. Therefore, determining the appropriate target masking area can ensure the masking effect and minimize the impact on the surrounding environment.

In some embodiments, the neural network model is trained as follows. The neural network model can be trained using a loss function corresponding to each of at least one of the speech intelligibility of the mixed sound signal, the speech recognition accuracy of the mixed sound signal, the energy of the masking signal, and the energy of the mixed sound signal. The loss function is obtained by calculating according to speech obtained after the target speech superimposed with the masking signal is transmitted to a playing position and speech obtained after the target speech without being superimposed with the masking signal is transmitted to the playing position. During training of the neural network model, when considering a variety of masking effect-related loss functions, the masking signal generated by the trained neural network model is more in line with the target masking effect.

In some embodiments, the masking signal is generated according to the neural network model and the target speech as follows. An end-to-end neural network model is used to directly generate the masking signal according to the input target speech. Alternatively, the neural network model is used to dynamically estimate parameters of a masking generation algorithm, and the masking signal is generated according to the masking generation algorithm and the estimated parameters. Therefore, when generating the neural network model, the neural network model that can directly obtain the corresponding masking signal according to the target speech can be directly generated. Alternatively, the neural network model of which dynamic parameters provided by the traditional masking generation algorithm can be generated. The traditional masking generation algorithm generates fixed masking signals mainly because the parameters could not be dynamically changed, and therefore, in the disclosure, using the neural network model to dynamically generate various parameters, such that the masking signal that meet the target masking effect can be generated by using the traditional masking generation algorithm. In this way, the neural network model can be trained according to different requirements, so that the method can be applied in more scenarios.

In some embodiments, the end-to-end neural network model includes an encoder-decoder structure, wherein encoder and decoder are convolutional network structures, wherein the encoder is configured to perform feature extraction and conversion of a signal of the target speech input to convert the signal of the target speech into an intermediate representation, and the decoder is configured to decode the intermediate representation to convert the intermediate representation into the masking signal corresponding to the target speech.

In some embodiments, the masking generation algorithm is a time-reversed speech masking generation algorithm, where parameters of the time-reversed speech masking generation algorithm include a reversed time length and an energy magnitude of the masking signal. This time-reversed traditional speech masking generation algorithm can be used to generate a masking signal for the target speech that matches the target masking effect.

BRIEF DESCRIPTION OF THE DRAWINGS

One or more embodiments are exemplary illustrated by the pictures in the accompanying drawings, which do not constitute a limitation to the embodiments, elements having the same reference numeric designations in the drawings are represented as similar elements, and the drawings in the drawings do not constitute a scale limitation unless otherwise stated.

DETAILED DESCRIPTION OF THE EMBODIMENTS

Figure 1:
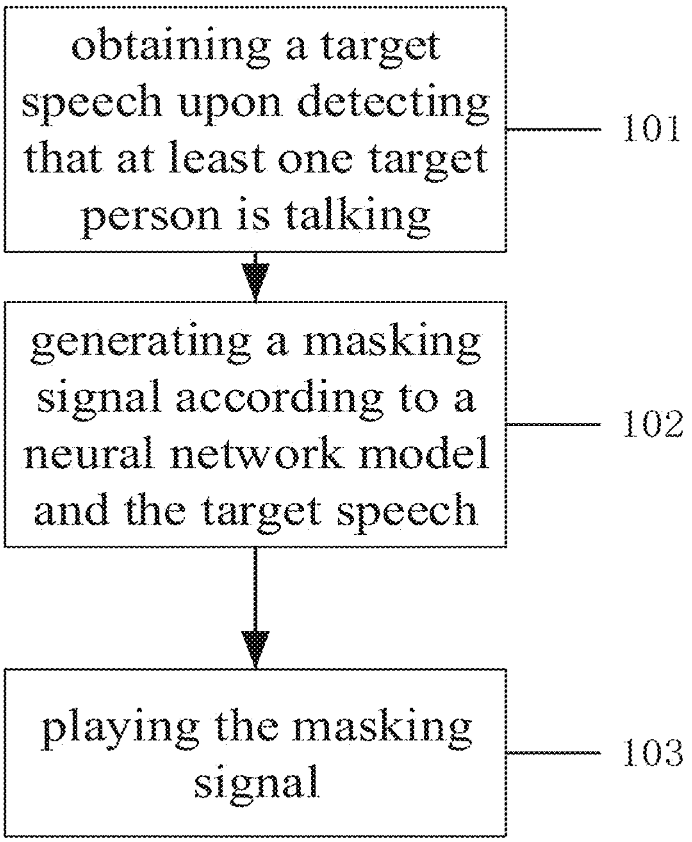
FIG. 1 is a flow chart of a speech masking method according to an embodiment of the present disclosure.

In order to make the purpose, technical proposal, and advantages of the embodiments of the present disclosure clearer, the embodiments of the present disclosure will be described in detail in conjunction with the accompanying drawings below. However, it will be appreciated by those of ordinary skill in the art that in various embodiments of the present disclosure, a number of technical details are proposed to enable the reader to better understand the present disclosure. However, even without these technical details and variations and modifications based on the following embodiments, the technical scheme required to be protected by the present disclosure can be achieved. The following embodiments are divided for convenience of description without constituting any limitation on the specific implementation of the present disclosure and can be combined and referenced without contradiction.

Speech masking technology involves the needs of communication security and privacy protection. With the rapid development of communication technology, people's call content is more and more easy to be eavesdropped and leaked, which leads to an urgent need for communication privacy protection. In order to protect the privacy of calls, speech masking technology came into being. The speech masking technology is a technique to make the communication content unintelligible to unauthorized personnel by playing specific masking signals, for example by confusing the voice of calls or adding noise to the voice of calls. This technology can be applied to, for example, call scenarios in real time, to ensure that the communication content is merely understood by the participants and is unintelligible to others. The speech masking technology for private calls can be applied to various scenarios that need to protect the privacy of calls, including business negotiations, legal consultations, and medical consultations, etc. The technology is achieved as follows. The speaker's voice is generally collected through the microphone, a specific masking signal is generated after analysis of the speaker's voice, and then the masking signal is played through the speaker. The embodiments of the disclosure can be applied to the in-vehicle scenario. The microphone in the car can be used to collect the voice of the back seat passengers, a masking signal is generated after analysis and processing, and then the masking signal is played through the driver's headrest speaker, so that the driver could not hear the conversation content of the back seat passengers, to achieve privacy protection.

Embodiments of the present disclosure relate to a speech masking method, which can be applied in masking devices. The masking devices can be applied in different communication places. In this embodiment, a target speech is obtained when a target person is detected to speak. A training method for training a neural network model is determined according to a target masking effect to train the neural network model. A masking signal is generated according to the neural network model and the target speech. Thereafter, the masking signal is played. In the embodiment of the present disclosure, after the target speech is obtained, the target speech is not masked according to the traditional fixed masking method, but the target masking effect is determined in advance, and the target masking effect can be determined according to different needs. After that, the neural network model is trained according to different target masking effects, and the neural network model trained according to the different target masking effects can dynamically provide different masking signals for target speeches. In this way, different masking signals can be generated for different target speeches according to different needs, more scenarios are suitable, good masking effects can be obtained, and user experience can be improved. The implementation details of the speech masking method of the present embodiment will be described in detail below. The following contents are merely for the convenience of understanding the provided implementation details and are not necessary for implementing the present scheme.

As shown in FIG. 1, at step 101, a masking device in a scene first detects whether at least one target person is talking, and obtains a target speech upon detecting that the target person is talking.

In one example, the embodiments of the disclosure are applied in the in-vehicle scene. The target speech is collected from at least one back seat passenger. When the microphone in the car detects that the at least one back seat passenger is conducting voice communication, the target speech can be collected. In this case, the target speech is defined as s, and a transfer function of the microphone is defined as $F_M$.

At step 102, a masking signal is generated according to a neural network model and the target speech.

At step 103, the masking signal is played.

A training manner for the neural network model is determined according to a target masking effect.

In one example, the masking signal may be played through a loudspeaker. In one example, if a transfer function of the loudspeaker is defined as $F_L$, a transfer function from the loudspeaker to a receiving party (audience) is defined as $F_{L2L}$, a transfer function from a target person (the back seat passenger in this embodiment) to the receiving party (the front seat driver in this embodiment) is defined as $F_{S2L}$, and the neural network model is defined as Net, the masking signal heard by the receiving party is represented as follows:

$$m' = F_{L2L}(F_L(\mathrm{Net}(F_M(s)))).$$

A target speech heard by the receiving party is $s'=F_{S2L}(s)$.

Therefore, the mixed sound heard by the receiving party can be represented as s'+m'. According to mixed sound s'+m' and the original target speech s, a loss function related to the masking effect can be designed as: Loss (s'+m',s).

Figure 2:
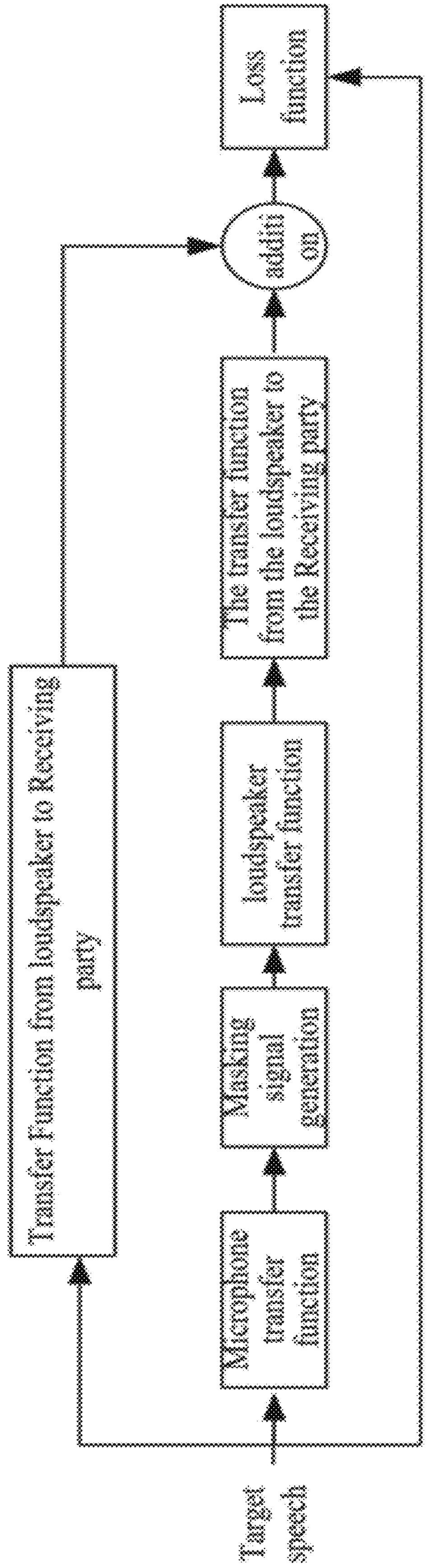
FIG. 2 is a schematic diagram of a neural network-based speech masking system training framework according to an embodiment of the present disclosure.

Specifically, a neural network-based speech masking system training framework is shown in FIG. 2.

In one example, the target speech is obtained upon detecting that the target person is talking as follows. A microphone device (the masking device) detects that the target person has made voice in a call environment. When voice information included in the voice is determined as voice information that requires privacy protection, the voice is marked as the target speech and is obtained. This method can be applied to various scenarios that require privacy protection, for example, including business negotiations, legal consultation, and medical consultation, etc.

In one example, the target masking effect includes a speech masking effect and a comfort degree of a receiving party for receiving the masking signal (masking signal receiver). The speech masking effect includes at least one of speech intelligibility of a mixed sound signal, i.e., intelligibility of speech obtained after the masking signal is superimposed with the original target speech, and speech recognition accuracy of the mixed sound signal. The comfort degree includes at least one of energy of the masking signal and energy of the mixed sound signal. The lower the speech intelligibility of the mixed sound signal, the better the speech masking effect. The lower the speech recognition accuracy of the mixed sound signal is, the better the speech masking effect is. The lower the energy of the masking signal, the higher the comfort degree. The lower the energy of the mixed sound signal, the higher the comfort degree. The mixed sound signal is obtained by mixing the signal of the target speech and the masking signal. During determining of the target masking effect, it is necessary to comprehensively consider multiple factors, to ensure that the masking effect can be achieved while considering the impact of the masking signal played on other personnel. Therefore, during determining of the target masking effect, the experience of the target user and the masking signal receiver can be enhanced when comprehensively considering the above factors.

The neural network model can be trained using a loss function corresponding to each of at least one of the speech intelligibility of the mixed sound signal, the speech recognition accuracy of the mixed sound signal, the energy of the masking signal, and the energy of the mixed sound signal. The loss function is obtained by calculating according to speech obtained after the target speech superimposed with the masking signal is transmitted to a playing position and speech obtained after the target speech without being superimposed with the masking signal is transmitted to the playing position.

Specifically, based on the mixed sound s'+m' heard by the receiving party and the original target speech s, in the present disclosure, the neural network model can be trained based on a variety of masking effect-related loss functions.

The loss function for the speech intelligibility (e.g., short-time objective intelligibility, STOI) is represented as: $L_{STOI}$ (s'+m',s)=STOI (s'+m',s).

The lower the speech intelligibility of the mixed audio after masking, the better the masking effect.

The loss function for the accuracy of speech recognition (e.g., automatic speech recognition, ASR) accuracy of the mixed signal is as follows: $L_{ASR}$(s'+m',s)=Accuracy (ASR (s'+m'), ASR(s)).

The lower the speech recognition accuracy of the mixed audio after masking, the better the masking effect.

The loss function for the energy of the masking signal is as follows:

$$L_{E1}(m'/s') = \sum_{i=m}^{n} \cdot (\text{Energy}(m'_i) * bmld_i / \text{Energy}(s'_i)).$$

Combined with binaural masking level difference (BMLD), the energy of the masking signal in different characteristic frequency bands (e.g., critical band, CB) is controlled to achieve minimum volume masking, where the subscript i denotes the serial number of the CB. Upper and lower limits of the above summation formula can also be determined according to the frequency band characteristics of the actual signal to be masked. For example, for a speech signal, only the CB (BAND 1-BAND 18) covering the frequency band of 100 Hz to 4 kHz can be selected for analysis.

The loss function for the energy of the mixed sound signal is represented as follows: $L_{E2}$(s'+m')=Energy(s'+m').

The lower the energy of the mixed sound signal, the higher the acceptance of the receiving party.

The final loss function can be a superposition of multiple loss functions and can be represented as:

$$\text{Loss}(s'+m', s) = L_{STOI}(s'+m', s) + L_{ASR}(s'+m', s) + L_{E1}(m'/s') + L_{E2}(s'+m').$$

After all the loss functions are obtained, the optimal neural network model can be obtained by minimizing the loss function in the training of the neural network model.

In one example, it is also necessary to determine a target masking area before playing the masking signal. The lower the volume of the masking signal in an area outside the target masking area, the smaller the impact of the masking signal on the surrounding environment. In different scenarios, the masking signal may be played for different receiving targets. Therefore, determining the appropriate target masking area can ensure the masking effect and minimize the impact on the surrounding environment.

Specifically, if the masking signal is a multi-channel signal, on the basis of the above loss functions, a loss function related to loudspeaker directional playback can be introduced. For example, the volume of the masking signal in the area outside the receiving party is minimized, to reduce the influence of the masking signal on the area outside the target masking area is reduced. In this embodiment, there may be Z areas other than the target masking area, a transfer function from the loudspeaker to a z-th (z=1, 2, . . . , Z) area is defined as $F_{L2L\_z}$, and a masking signal transmitted to the z-th area is represented by: $m_z=F_{L2L\_z}(F_L(\text{Net}(F_M(s))))$.

The total energy of the masking signals in the areas outside the target masking $$L_{E3} = \sum_{z=1}^{Z} \text{Energy}(m_z).$$

The loss function for the total energy of the masking signals of the areas outside the target masking area may be added to the loss function described above: Loss=Loss+$L_{E3}$.

In one example, since there is also a distance difference between the binaural ears of the receiving party, it is possible to optimize the signals received by the binaural ears separately. Specifically, if a transfer function from the loudspeaker to the left ear of the receiving party is defined as $F_{L2L\_l}$, a transfer function from the loudspeaker to the right ear of the receiving party is defined as $F_{L2L\_r}$, and a transfer function from a speaker (at least one target person) to the receiving party is defined as $F_{S2L\_l}F_{S2L\_r}$, a masking signal heard by the left ear and a masking signal heard by the right ear of the receiving party are represented by:

$$m'_l = F_{L2L\_l}(F_L(\text{Net}(F_M(s))))$$

$$m'_r = F_{L2L\_r}(F_L(\text{Net}(F_M(s))))$$

The target speech heard by the left ear and the target speech heard by the right ear of the receiving party are represented by:

$$s'_l = F_{S2L\_l}(s)$$

$$s'_r = F_{S2L\_r}(s)$$

The loss function can be expressed as a superposition of loss functions from the loudspeaker to the left and right ears:

$$\text{Loss} = \text{Loss}(s'_l + m'_l, s_l) + \text{Loss}(s'_r + m'_r, s_r)$$

During training of the neural network model, when considering a variety of masking effect-related loss functions, the masking signal generated by the trained neural network model is more in line with the target masking effect.

In one example, the masking signal is generated according to the neural network model and the target speech as follows. An end-to-end neural network model is used to directly generate the masking signal according to the input target speech. Alternatively, the neural network model is used to dynamically estimate parameters of a masking generation algorithm, and the masking signal is generated according to the masking generation algorithm and the estimated parameters. Therefore, when generating the neural network model, the neural network model that can directly obtain the corresponding masking signal according to the target speech can be directly generated. Alternatively, the neural network model of which dynamic parameters provided by the traditional masking generation algorithm can be generated. The traditional masking generation algorithm generates fixed masking signals mainly because the parameters could not be dynamically changed, and therefore, in the disclosure, using the neural network model to dynamically generate various parameters, such that the masking signal that meet the target masking effect can be generated by using the traditional masking generation algorithm. In this way, the neural network model can be trained according to different requirements, so that the method can be applied in more scenarios.

Specifically, the end-to-end neural network model is used to generate the masking signal as follows. For example, the end-to-end neural network model is used to output a masking signal frame for a signal frame (such as 10 ms) of an input speech. The input and output signals of the network model can be time-domain signals or frequency-domain signals and are converted through short time Fourier transform (STFT) and inverse short-time Fourier transform (ISTFT). The network structure can adopt the common encoder-decoder structure, where the encoder is configured to be responsible for feature extraction and conversion of the input speech signal, to convert the input speech signal into an intermediate representation (e.g., a vector). This vector can contain various information about the speech signal, such as spectral characteristics, duration information, and so on. The decoder is configured to be responsible for decoding the intermediate representation to convert the intermediate representation into a masking signal corresponding to the original speech signal.

During using of the traditional masking generation algorithm, the neural network model is used to dynamically estimate the parameters of the traditional masking generation algorithm, thereby achieving generation of dynamic masking signals. For example, for time-reversed speech masking generation methods, different reversed time lengths and energy of the masking signal may lead to different masking effects. Compared with the traditional method in which the time length T and masking energy E are fixed, the neural network model can be used to analyze the input speech signal, dynamically estimate the most suitable reversed time length and masking energy of the current signal, and then use the time-reversed algorithm to generate masking signals. The network structure referred to herein can use the result of encoder-multilayer perceptron (MLP) structure. The encoder is configured to extract signal features (which can be CNN structures), and the MLP is configured to obtain last estimated parameters by calculating, such as time length T and masking energy E. The larger the energy of the masking signal, the better the masking effect.

The step division of the above method is only for clear description. When realized, the above steps can be merged into one step or some steps can be split and decomposed into a plurality of steps, all of which are within the protection scope of the disclosure, as long as the same logical relationship is included. Adding insignificant modifications or introducing insignificant designs to an algorithm or process without changing the core design of the algorithm and process is within the protection scope of the disclosure.

In this embodiment, after the target speech is obtained, the target speech is not masked according to the traditional fixed masking method, but the target masking effect is determined in advance, and the target masking effect can be determined according to different needs. After that, the neural network model is trained according to different target masking effects, and the neural network model trained according to the different target masking effects can dynamically provide different masking signals for the target speech. In this way, different masking signals can be generated for different target speeches according to different needs, more scenarios can be applied, and good masking effects can be obtained, thereby improving user experience.

Figure 3:
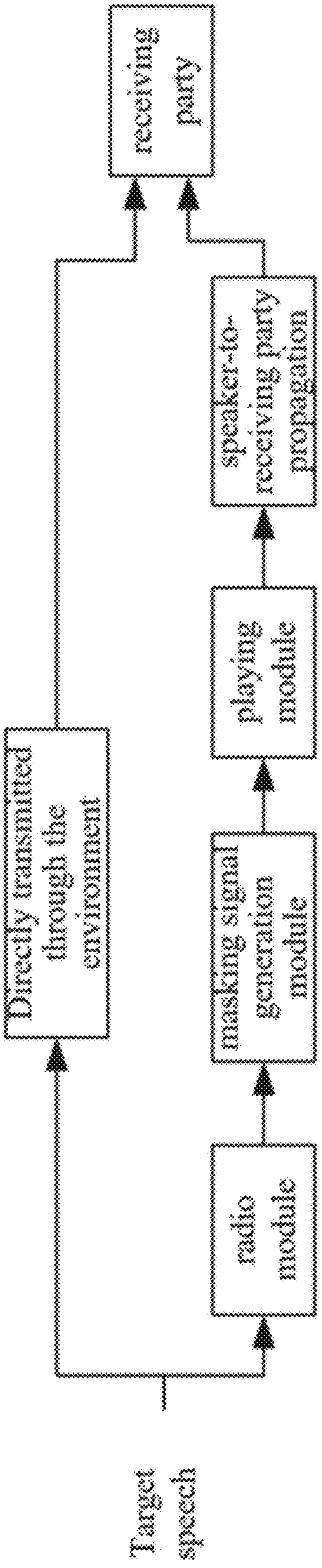
FIG. 3 is a schematic diagram of a speech masking system according to an embodiment of the present disclosure.

Embodiments of the disclosure relate to a speech masking system, and the system includes a radio module, a masking signal generation module, and a playing module. The radio module includes a microphone configured to obtain a target speech upon detecting that a target person is talking and to transmit the target speech to the masking signal generation module. The masking signal generating module is configured to generate a masking signal using a neural network model after receiving the target speech, and to send the masking signal to the playing module. The playing module includes a loudspeaker configured to play the masking signal. As shown in FIG. 3, the target speech may also directly reach the receiving party's position through sound propagation of the environment. The receiving party receives both the masking signal and the target speech, and the receiving party could not know the content of the target speech due to effect of the masking signal.

It shall be understood that the present embodiment is an embodiment of a system corresponding to the above-mentioned method embodiment, and the present embodiment can be implemented in cooperation with the above-mentioned method embodiment. The relevant technical details mentioned in the above-mentioned method embodiments are still valid in this embodiment, and will not be repeated herein in order to reduce duplication. Accordingly, the related technical details mentioned in this embodiment can also be applied in the above-described method embodiment.

It is to be noted that each module involved in this embodiment is a logic module. In practical application, a logical unit may be a physical unit, a part of a physical unit, or a combination of a plurality of physical units. Further, in order to highlight the creative part of the present disclosure, the unit that is less closely related to solving the technical problems raised by the present disclosure is not introduced in the present embodiment, but this does not indicate that other units do not exist in the present embodiment.

Figure 4:
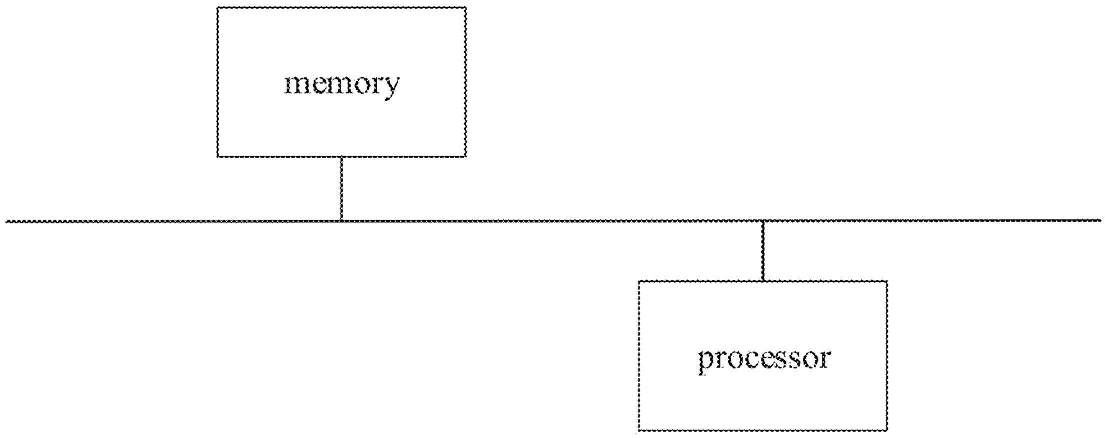
FIG. 4 is a schematic diagram of an electronic device according to an embodiment of the present disclosure.

Embodiments of the disclosure relate to an electronic device. As shown in FIG. 4, the electronic device includes at least one processor and a memory communicatively connected to the at least one processor. The memory stores instructions executable by the at least one processor. The instructions, when executed by the at least one processor, cause the at least one processor to execute the speech masking method as described above.

The memory and the at least one processor are connected through at least one bus, and the at least one bus can include any number of interconnected buses and bridges. The at least one bus is configured to connect various circuits of one or more processors and the memory together. The at least one bus may also connect together various other circuits such as peripherals, voltage regulators, and power management circuits, which are known in the art and are therefore not described further herein. At least one bus interface is configured to provide an interface between the bus and a transceiver. The transceiver may be an element or a plurality of elements, such as a plurality of receivers and transmitters, which provide units for communicating with various other devices on a transmission medium. The data processed by the processor is transmitted over the wireless medium through an antenna, and the antenna is further configured to receive the data and transmit the data to the processor.

The processor is configured to be responsible for managing the bus and general processing, and to provide a variety of functions, including timing, peripheral interfaces, voltage regulation, power management, and other control functions. The memory can be configured to store data used by the processor in performing operations.

Embodiments of the present disclosure relate to a non-transitory computer readable storage medium in which computer programs are stored. The computer programs, when executed by a processor, cause the processor to perform the above method embodiments.

That is, one skilled in the art will understand that all or part of the steps in the method of the above embodiments can be accomplished by instructing the relevant hardware through a program stored in a storage medium, including a number of instructions for causing a device (may be a single chip, chip, etc.) or a processor to perform all or part of the steps of the method of the respective embodiments of the present disclosure. The aforementioned storage medium includes various media that can store program codes, such as a U disk, a mobile hard disk, a read-only memory (ROM), a random-access memory (RAM), a magnetic disk, or an optical disk.

Those of ordinary skill in the art will appreciate that the above embodiments are specific embodiments of implementing the present disclosure, and in practical application, various changes can be made to them in form and detail without departing from the spirit and scope of the present disclosure.

What is claimed is:

1. A speech masking method, comprising;

obtaining a target speech upon detecting that at least one target person is talking;

determining a training manner for a neural network model according to a target masking effect and training the neural network model;

generating a masking signal according to the neural network model trained and the target speech; wherein training the neural network model includes:

training the neural network model using a loss function corresponding to each of at least one of the speech intelligibility of the mixed sound signal, the speech recognition accuracy of the mixed sound signal, the energy of the masking signal, and the energy of the mixed sound signal;

wherein the loss function is obtained by calculating according to speech obtained after the target speech superimposed with the masking signal is transmitted to a playing position and speech obtained after the target speech without being superimposed with the masking signal is transmitted to the playing position; after obtaining the loss function, the optimized neural network model is obtained by minimizing the loss function during the training of the neural network model; and before playing the masking signal, determining a target masking area; based on the loss function, a speaker is set to play the loss function directionally to minimize a volume of the masking signal in areas outside the target masking area; the volume of the masking signal in areas outside the target masking area is lower than that within the target masking area; playing the masking signal.

2. The speech masking method of claim 1, wherein obtaining the target speech upon detecting that the at least one target person is talking includes:

detecting by a microphone that the at least one target person is making voice in a call environment; and marking, in response to voice information included in the voice being voice information that requires privacy protection, the voice as the target speech and obtaining the target speech.

3. The speech masking method of claim 1, wherein the target masking effect includes a speech masking effect and a comfort degree of a receiving party for receiving the masking signal, wherein the speech masking effect includes at least one of speech intelligibility of a mixed sound signal and speech recognition accuracy of the mixed sound signal, and the comfort degree includes at least one of energy of the masking signal and energy of the mixed sound signal;

wherein the mixed sound signal is obtained by mixing a signal of the target speech and the masking signal.

4. The speech masking method of claim 1, wherein generating the masking signal according to the neural network model trained and the target speech includes:

using an end-to-end neural network model to generate the masking signal according to the target speech input; or using the neural network model to dynamically estimate parameters of a masking generation algorithm, and geniting the masking signal according to the masking generation algorithm and the estimated parameters.

5. The speech masking method of claim 4, wherein the end-to-end neural network model includes an encoder-decoder structure, wherein encoder and decoder are convolutional network structures, wherein the encoder is configured to perform feature extraction and conversion of a signal of the target speech input to convert the signal of the target speech into an intermediate representation, and the decoder is configured to decode the intermediate representation to convert the intermediate representation into the masking signal corresponding to the target speech.

6. The speech masking method of claim 4, wherein the masking generation algorithm is a time-reversed speech masking generation algorithm, wherein parameters of the time-reversed speech masking generation algorithm include a reversed time length and an energy magnitude of the masking signal.

7. A speech masking system, comprising:

a radio module including a microphone configured to receive a target speech and to transmit the target speech to a masking signal generation module;

the masking signal generation module being configured to generate a masking signal using a neural network model after receiving the target speech, and to send the masking signal to a playing module, wherein a training manner for the neural network model is determined according to a target masking effect; wherein training the neural network model includes:

training the neural network model using a loss function corresponding to each of at least one of the speech intelligibility of the mixed sound signal, the speech recognition accuracy of the mixed sound signal, the energy of the masking signal, and the energy of the mixed sound signal;

wherein the loss function is obtained by calculating according to speech obtained after the target speech superimposed with the masking signal is transmitted to a playing position and speech obtained after the target speech without being superimposed with the masking signal is transmitted to the playing position; after obtaining the loss function, the optimized neural network model is obtained by minimizing the loss function during the training of the neural network model; and before playing the masking signal, determining a target masking area; based on the loss function, a speaker is set to play the loss function directionally to minimize a volume of the masking signal in areas outside the target masking area; the volume of the masking signal in areas outside the target masking area is lower than that within the target masking area; and the playing module including a loudspeaker configured to play the masking signal, such that the masking signal is transmitted to a receiving party.

8. An electronic device, comprising:

at least one processor; and a memory communicatively connected with the at least one processor;

wherein the memory is configured to store instructions executable by the at least one processor, and the instructions, when executed by the at least one processor, cause the at least one processor to execute:

obtaining a target speech upon detecting that at least one target person is talking;

determining a training manner for a neural network model according to a target masking effect and training the neural network model;

generating a masking signal according to the neural network model trained and the target speech; wherein training the neural network model includes:

training the neural network model using a loss function corresponding to each of at least one of the speech intelligibility of the mixed sound signal, the speech recognition accuracy of the mixed sound signal, the energy of the masking signal, and the energy of the mixed sound signal;

wherein the loss function is obtained by calculating according to speech obtained after the target speech superimposed with the masking signal is transmitted to a playing position and speech obtained after the target speech without being superimposed with the masking signal is transmitted to the playing position; after obtaining the loss function, the optimized neural network model is obtained by minimizing the loss function during the training of the neural network model; and before playing the masking signal, determining a target masking area; based on the loss function, a speaker is set to play the loss function directionally to minimize a volume of the masking signal in areas outside the target masking area; the volume of the masking signal in areas outside the target masking area is lower than that within the target masking area; playing the masking signal.

9. The electronic device of claim 8, wherein the instructions, when executed by the at least one processor to execute obtaining the target speech upon detecting that the at least one target person is talking, cause the at least one processor to execute:

detecting by a microphone that the at least one target person is making voice in a call environment; and marking, in response to voice information included in the voice being voice information that requires privacy protection, the voice as the target speech and obtaining the target speech.

10. The electronic device of claim 8, wherein the target masking effect includes a speech masking effect and a comfort degree of a receiving party for receiving the masking signal, wherein the speech masking effect includes at least one of speech intelligibility of a mixed sound signal and speech recognition accuracy of the mixed sound signal, and the comfort degree includes at least one of energy of the masking signal and energy of the mixed sound signal;

wherein the mixed sound signal is obtained by mixing a signal of the target speech and the masking signal.

11. The electronic device of claim 8, wherein the instructions, when executed by the at least one processor to execute generating the masking signal according to the neural network model trained and the target speech, cause the at least one processor to execute:

using an end-to-end neural network model to generate the masking signal according to the target speech input; or using the neural network model to dynamically estimate parameters of a masking generation algorithm, and geniting the masking signal according to the masking generation algorithm and the estimated parameters.

12. The electronic device of claim 11, wherein the end-to-end neural network model includes an encoder-decoder structure, wherein encoder and decoder are convolutional network structures, wherein the encoder is configured to perform feature extraction and conversion of a signal of the target speech input to convert the signal of the target speech into an intermediate representation, and the decoder is configured to decode the intermediate representation to convert the intermediate representation into the masking signal corresponding to the target speech.

13. The electronic device of claim 11, the masking generation algorithm is a time-reversed speech masking generation algorithm, wherein parameters of the time-reversed speech masking generation algorithm include a reversed time length and an energy magnitude of the masking signal.

* * * * *